(12) United States Patent
Leifer et al.

(10) Patent No.: US 12,038,600 B2
(45) Date of Patent: Jul. 16, 2024

(54) PLANAR PHOTONIC WAVEGUIDE OPTICAL PULSE RATE MULTIPLIER

(71) Applicant: California Institute of Technology, Pasadena, CA (US)

(72) Inventors: Stephanie D. Leifer, Pasadena, CA (US); Wei Zhang, Pasadena, CA (US); Andrey B. Matsko, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 302 days.

(21) Appl. No.: 17/643,974

(22) Filed: Dec. 13, 2021

(65) Prior Publication Data

US 2022/0187533 A1    Jun. 16, 2022

Related U.S. Application Data

(60) Provisional application No. 63/125,322, filed on Dec. 14, 2020.

(51) Int. Cl.
*G02F 1/21* (2006.01)
*G02B 6/12* (2006.01)
*G02B 6/125* (2006.01)

(52) U.S. Cl.
CPC ......... *G02B 6/12007* (2013.01); *G02B 6/125* (2013.01); *G02F 1/212* (2021.01); *G02B 2006/12061* (2013.01); *G02B 2006/12147* (2013.01); *G02B 2006/1215* (2013.01)

(58) Field of Classification Search
None
See application file for complete search history.

(56) References Cited

U.S. PATENT DOCUMENTS

| | | | | |
|---|---|---|---|---|
| 6,563,620 B1* | 5/2003 | Hakimi | .............. | G02B 6/29355 398/140 |
| 2003/0194184 A1* | 10/2003 | Carberry | ............ | G02B 6/29386 385/39 |
| 2004/0037500 A1* | 2/2004 | Yoo | ........................ | H04J 14/005 385/31 |

OTHER PUBLICATIONS

Haboucha et al., "Optical-fiber pulse rate multiplier for ultralow phase-noise signal generation", Optic Letter, vol. 36, No. 18, Sep. 15, 2011, pp. 3654-3656.
Nambiar et al., "High efficiency DBR assisted grating chirp generators for silicon nitride fiber-chip coupling", Scientific Reports, vol. 9, No. 18821, 2019, pp. 1-9, doi: 10.1038/s41598-019-55140-8.

* cited by examiner

*Primary Examiner* — Chad H Smith
(74) *Attorney, Agent, or Firm* — KPPB LLP

(57) ABSTRACT

Disclosed herein is a pulse repetition rate multiplier including a photonic integrated circuit (PIC) including cascading Mach-Zehnder interferometers (MZIs). An input may be connected to one end of the PIC and an output may be connected to the other end of the PIC such that a signal from the input runs through the cascading MZIs and out the output. The input may be configured to receive an input pulsed signal and the output may be configured to output a repetition rate multiplied signal. Advantageously, using a PIC as opposed to an optical fiber-based pulse rate multiplier allows for accurate fabrication of a pulse repetition rate multiplier configured to accept higher frequency pulsed signals.

22 Claims, 6 Drawing Sheets

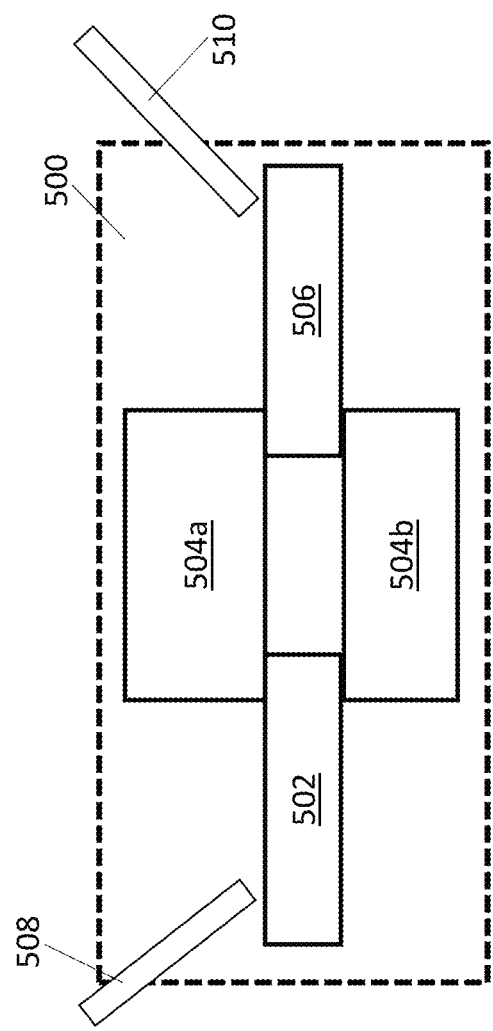

PLANAR PHOTONIC WAVEGUIDE OPTICAL PULSE RATE MULTIPLIER

CROSS-REFERENCE TO RELATED APPLICATIONS

This application claims the benefit of and priority under 35 U.S.C. § 119(e) to U.S. Provisional Patent Application Ser. No. 63/125,322 entitled "Planar Photonic Waveguide Optical Pulse Rate Multiplier," filed Dec. 14, 2020, which is incorporated herein by reference in its entirety for all purposes.

STATEMENT OF FEDERAL SUPPORT

This invention was made with government support under Grant No. 80NMO0018D0004 awarded by NASA (JPL). The government has certain rights in the invention.

FIELD OF THE INVENTION

The present invention generally relates to an optical pulse rate multiplier and more specifically a planar photonic waveguide optical pulse rate multiplier.

BACKGROUND

Low-phase noise and frequency stable microwave signals may be useful in a wide variety of scientific and technological applications, including precise timing, phased array radars, arbitrary waveform generation, photonic processing, and atomic frequency standards. Some examples of low noise microwave sources are based on ultralow-noise sapphire, or optoelectronic oscillators. Despite good performance of these devices, there continues to be great interest in developing simpler or more robust devices that can equal or better their performance. In particular one challenging aim for researchers has been the development of a single device that exhibits low phase fluctuations across the spectrum from low Fourier frequencies (1 Hz) to the highest (>1 MHz). One possible route to achieving such comprehensive performance would be low-noise frequency division of a laser that has been stabilized to a mode of a vibration-insensitive reference cavity. In this approach, the divided signal would carry the frequency stability of the original while the division process itself improves the signal-to-noise ratio by the division ratio.

Low-phase noise and frequency stable microwave signals may be used as calibration sources for high resolution astronomical spectrographs used for exoplanet detection and characterization using the precision radial velocity (PRV) technique. The PRV technique entails observing the Doppler shift of light from planet-hosting stars. An example stability calibration source for this purpose is the optical frequency comb, also referred to as the "astrocomb". Available mode-elocked laser astrocombs in the visible portion of the spectrum have low intrinsic repetition rates (up to 1 GHz). Because the radial velocity spectrographs require mode spacing in the 10 GHz to 30 GHz regime, the comb light must also be mode filtered through a series of Fabry-Perot (FP) cavities to reject 99% of the comb lines due to the low comb repetition rate. This rejected light is lost. Furthermore, the large amount of optical power in the blue end of the spectrum may damage the photonic crystal fiber (PCF) used for nonlinear spectral broadening, requiring frequent replacement of this expensive component.

A critical part of NASA's exoplanet exploration program is PRV detection and characterization of exoplanets, as it may be the only method of determining exoplanet mass from ground-based observations. PRV plays an important role in understanding potential direct imaging targets for space-based missions. Stable, robust, long-lived, affordable spectrograph calibration sources may be on the critical path to enabling PRV observations at or below the 10 cm/s level that is the signature of terrestrial analogs.

SUMMARY OF THE INVENTION

Various embodiments are directed to an optical frequency comb repetition rate multiplier including: an input; an output; a photonic integrated circuit (PIC) including cascading Mach-Zehnder interferometers (MZIs). The input is connected to one end of the PIC and the output is connected to the other end of the PIC such that a signal from the inputs runs through the cascading MZIs and out of the output. The input is configured to receive an input pulsed signal and the output is configured to output a repetition rate multiplied signal.

In various other embodiments, each of the MZIs includes: an input splitter which splits an input signal into a first branch and a second branch, where the first branch is longer than the second branch by an odd number of multiples of half an input period, and an output combiner which combines the signal from the first branch and the second branch into a multiplied signal.

In still various other embodiments, the cascading MZIs include a plurality of MZIs connected in series.

In still various other embodiments, each of the MZIs double the input pulsed signal.

In still various other embodiments, the PIC is a monolithic chip with planar components.

In still various other embodiments, the monolithic chip includes optical waveguides directly embedded in the monolithic chip.

In still various other embodiments, each of the MZIs is fabricated including a first branch and a second branch which includes optical waveguides directly embedded in the monolithic chip.

In still various other embodiments, the cascading MZIs are connected together with optical waveguides directly embedded in the monolithic chip.

In still various other embodiments, at least one of the MZIs includes a first branch and a second branch which includes feedback servos that actively control the branch length of the first branch and the second branch.

In still various other embodiments, the optical frequency comb repetition rate multiplier further includes an optical fiber-based pulse rate multiplier, where the input is connected to the optical fiber-based pulse rate multiplier and the PIC is connected in series with the optical fiber-based pulse rate multiplier.

In still various other embodiments, the optical frequency comb repetition rate multiplier further includes a pulse generator connected to the input and configured to generate pulses with a certain frequency.

In still various other embodiments, the output of the optical fiber-based pulse rate multiplier is less than 3 GHz.

In still various other embodiments, the optical fiber-based pulse rate multiplier includes cascading MZIs each including a first branch and a second branch which include optical fibers.

In still various other embodiments, the optical fibers are all have a length greater than 2 cm.

In still various other embodiments, the input includes two or more inputs with one of the inputs providing the input pulsed signal and the other inputs serving as backups.

In still various other embodiments, the output includes two or more outputs with one of the outputs providing the output repetition rate multiplied signal and the other outputs serving as backups.

In still various other embodiments, the cascading MZIs includes three stages each connected in series.

In still various other embodiments, the first branch is longer than the second branch of the last stage MZI by less than 2 cm.

In still various other embodiments, the first branch is longer than the second branch of the last stage MZI by less than 2 mm.

In still various other embodiments, the feedback servos are actuated using a piezo-electric effect, an electro-optic effect, thermal changes, and/or carrier injection.

In still various other embodiments, the input splitter and the output combiner each comprise waveguide couplers, where the first branch and the second branch each include waveguides, and where the waveguide couplers and the waveguides are all connected planar structures on the PIC.

In still various other embodiments, the waveguide couplers include silicon nitride and/or indium phosphide.

In still various other embodiments, the waveguide couplers include silicon on insulator.

BRIEF DESCRIPTION OF THE DRAWINGS

The description will be more fully understood with reference to the following figures and data graphs, which are presented as various embodiment of the disclosure and should not be construed as a complete recitation of the scope of the disclosure, wherein:

FIG. 5 is a block diagram conceptually illustrating an example MWI integrated on a PIC in accordance with an embodiment of the invention.

DETAILED DESCRIPTION

Figure 1:
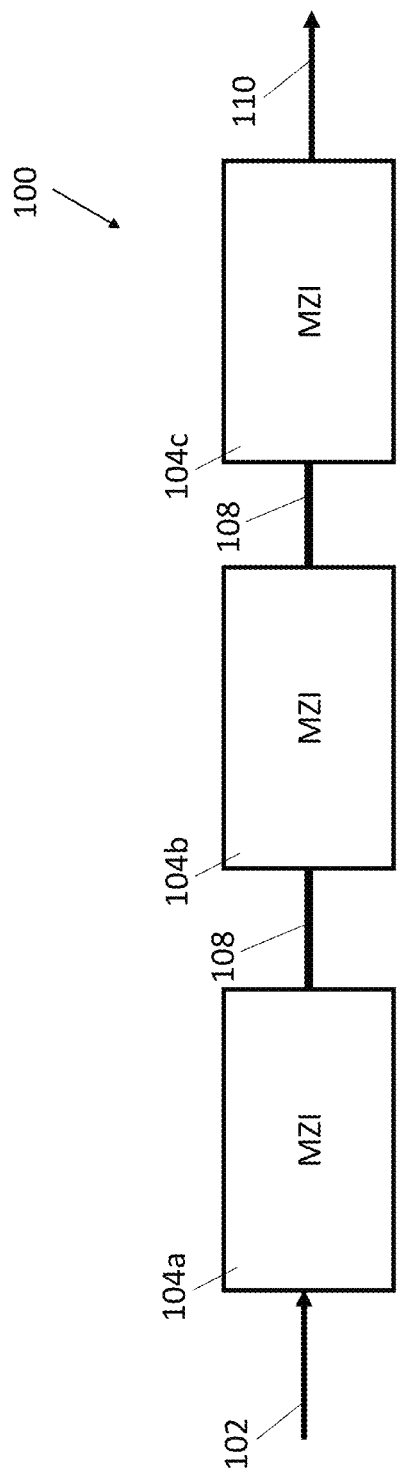
FIG. 1 conceptually illustrates an example of an integrated photonic device including cascaded MZIs in accordance with an embodiment of the invention.

Disclosed embodiments of the invention pertain to an integrated photonic technology that enables an increase in the repetition rate of an optical pulse train without introducing undesirable attenuation. Previous optical pulse rate multipliers are based on optical fibers. However, optical fibers cannot be used to increase the pulse repetition rate beyond 2-3 GHz. The optical fibers required to achieve the higher repetition rates are too short to be practical from a traditional fiber approach. Unlike earlier developments that allow a pulse repetition rate increase of a few GHz through the use of optical fiber delay lines, the photonic technology described herein is suitable for increasing the pulse repetition rate to between 10s and 100s of GHz. The photonic technology utilizes an integrated photonic device including an integrated monolithic photonic chip with optical waveguides. Advantageously, the optical waveguides on the integrated monolithic photonic chip may be fabricated with more precision for small lengths than optical fibers. Thus, the optical waveguides enable generation of high frequency repetition rate frequency multipliers with minimal power loss.

Other efforts to address the technology gap in mid-repetition rate (10 GHz-30 GHz) frequency combs for astronomy include taking near-IR electro-optic (EO) modulation frequency combs or soliton microcombs and producing combs in the visible through sum frequency generation, the Kerr nonlinearity (leading to self-phase modulation and four-wave mixing) and Raman scattering, or a combination of both. Both EO combs and appropriately engineered soliton microcombs intrinsically generate the desired mode spacing. However, the higher pulse repetition rate of these combs imposes a need for significantly higher average power to achieve the required pulse intensities for spectral broadening. The disclosed integrated photonic technology may allow spectral broadening to occur first at low pulse repetition rates where it has already been demonstrated, then create the sparser comb at visible wavelengths without damaging the nonlinear photonic media as occurs in state-of-the-art commercial astrocomb systems. Alternative calibration sources such as optical etalons still benefit from a stable reference like a frequency comb, and gas cells or arc lamps traditionally used in astronomical spectrograph calibration do not offer the density of spectral features and long-term stability needed for PRV applications.

In some embodiments, the integrated photonic device includes cascaded Mach-Zehnder interferometers (MZIs) to multiply the pulse repetition rate of a femtosecond laser. The integrated photonic device may be a frequency comb pulse rate multiplier. The laser pulse may be launched into a two-branch coupler, in which each arm length is an integer number of pulse spacings, but one is shorter than the other by a difference that is a half-period of the pulse spacing. In some embodiments, the arm length difference may be an odd number of multiples of half an input period (e.g., 1/2, 3/2, 5/2, etc.). The two arms may be combined at the output where the pulse trains are temporally interleaved. As a result, in the frequency domain, the pulse repetition rate is multiplied by 2. This process is repeated in subsequent stages where the output of each stage acts as the input of the next. In this manner, a net multiplication of 2N can be achieved in pulse repetition rate, where N is the number of stages.

FIG. 1 conceptually illustrates an example of an integrated photonic device 100 including cascaded MZIs in accordance with an embodiment of the invention. As illustrated, the integrated photonic device 100 includes a plurality of MZIs 104a,104b,104c which are connected via wiring 108. The first MZI 104a is configured to receive a pulsed signal 102 and the last MZI 104c is configured to output a frequency multiplied pulsed signal 110. The plurality of MZIs 104a,104b,104c each include a first branch and a second branch. One of the first branch or the second branch includes a length equal to an integer number of pulse spacings. The first branch and the second branch have a length difference that is equal to a half-period of the pulse spacing. Thus, one of the first branch or the second branch maintains the pulse spacing while the other of the first branch or the second branch is offset by half a period. When these two branches are added together, the frequency of the initial pulsed signal is effectively multiplied. This process is repeated throughout the plurality of MZIs 104a,104b,104c and thus for the example device the frequency of the frequency multiplied pulsed signal 110 is eight times ($2^3$) the frequency of the input pulsed signal 102. While this example includes three MZIs as the plurality of MZIs 104a,104b, 104c, it is understood that the plurality of MZIs may be more or less than three MZIs, such as two MZIs, four MZIs, five MZIs, six MZIs, seven MZIs, eight MZIs, nine MZIs, ten MZIs, or greater than ten MZIs. As additional MZIs are added in series, the number of pulsed signals increases $2^n$, where n is the number of MZIs—for example, four MZIs would produce $2^4$, or 16, signals, while eight MZIs would produce $2^8$, or 256, signals.

Figure 2:
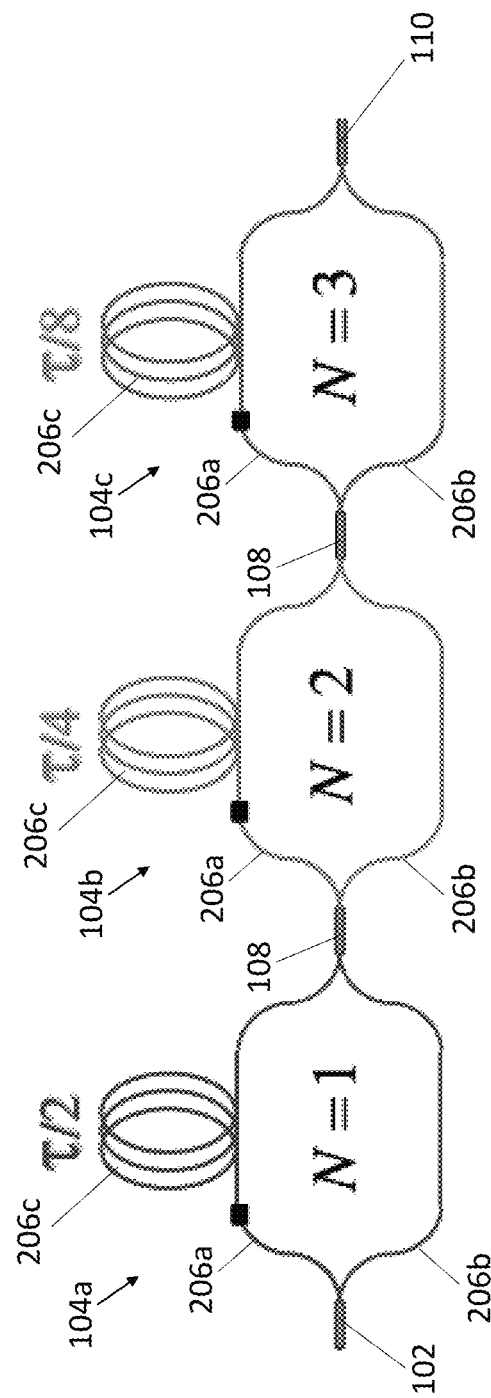
FIG. 2 schematically illustrates the integrated photonic device of FIG. 1 with details of the MZIs illustrated in accordance with an embodiment of the invention.

FIG. 2 schematically illustrates the integrated photonic device of FIG. 1 with details of the MZIs illustrated in accordance with an embodiment of the invention. The description of identically labeled elements of FIG. 1 is applicable to FIG. 2 and their description will not be repeated in detail. As illustrated the plurality of MZIs 104a,104b,104c may each includes a first branch 206a and a second branch 206b. The first branch 206a or the second branch 206b have a length equal to an integer number of pulse spacings. The first branch 206a and the second branch 206b have a length difference of half a period. In FIG. 2, a period is represented by T. As illustrated, a first MZI 104a has a first branch 206a which has additional length 206c of half a period ($\tau/2$) when compared to the length of the second branch 206b. In some embodiments, the additional length 206c of the first branch 206a and the second branch 206b may be an odd number of multiples of half the pulse spacing. For example, the additional length 206c may be 0.5, 1.5, 2.5, 3.5, etc. of the pulse spacing of the input signal 102. Thus, the one of the first branch 206a or the second branch 206b maintains the pulse spacing while the other of the first branch or the second branch is offset by half a period. When these two branches are added together, the frequency of the initial pulsed signal 102 is effectively multiplied. The output from the first MZI is double the input pulsed signal 102. A second MZI 104b has a first branch 206a which has additional length 206c of half a period of the pulsed signal from the first MZI 104a which would be equal to r/4. The output from the second MZI 104b is double the signal from the first MZI 104a which is four times the input pulsed signal 102. Finally, a third MZI 104c has a first branch 206a which has additional length 206c of half a period of the pulsed signal from the second MZI 104b which would be equal to r/8. The output from the third MZI 104c is double the signal from the second MZI 104b which is eight times the input pulsed signal 102. Thus, the output frequency multiplied pulsed signal 110 is eight times the input pulsed signal 102.

It has been discovered that a challenge to implementing this technology is how to create a well-balanced interferometer with the length of each branch of $$\frac{c}{2n \times f_{rep}}.$$

Where c is the speed of light, n is the group refractive index of the material at the optical frequency, and $f_{rep}$ is the repetition rate. In some embodiments, $f_{rep}$ may exceed 10 GHz. At smaller frequencies, the interferometer can be made using optical fibers. The pulse repetition rate multiplier can be fabricated by using inexpensive, off-the-shelf fiber-fused couplers in the first stage enabling pulse rate multiplication up to a few GHz. In this approach, 2×2 single mode fiber couplers with a 50/50 splitting ratio and a low insertion loss (<0.3 dB) are used to cascade the multiplier. For each stage, the fiber length for each branch the required difference may be produced by carefully cutting and splicing the fiber. The temporal displacement of the pulse trains may induce phase noise, so a <5% error in fiber length measurement and splicing in each stage is critical. Four-stage fiber-based multipliers have been produced which include significant effort required to keep the fiber length error to <2.5 mm. It was discovered that no higher frequency multiplication could be attained without compromising phase noise performance.

At 10 GHz frequency, the length difference between the first branch 206a and the second branch 206b may be less than 2 cm. The length difference may be 16 mm at 10 GHz frequency. At 100 GHz this length difference becomes less than 2 mm. The length difference may be 1.6 mm at 100 GHz frequency. Conventional optical fiber may not be precisely fabricated at such small lengths because such precise manufacturing of small length differences may be technically difficult and temperature variations may result in significant variations of the relative length. Consequentially, optical fiber within a few millimeters difference in length between the arms may not be fabricated. Thus, optical fibers may not be used for higher frequency multiplication. In various embodiments of the invention, planar photonic technology may provide a solution to the problem. The planar photonic technology may be in the form of a photonic integrated chip or circuit (PIC) including optical waveguides fabricated in a monolithic chip. In some embodiments, an integrated photonic chip may be used with fabricated waveguide for the first branch 206a and the second branch 206b which may allow for precisely fabricated lengths suitable for the plurality of MZIs 104a,104b,104c. While the fiber-based rate multipliers for the mode locked lasers have previously been used, only recent developments in low loss high power handling PICs with engineered broadband input-output optics as well as tuned-up chromatic dispersion make use of PICs for a pulse rate multiplier feasible.

In some embodiments, the integrated photonic chip may include an optical frequency comb repetition rate multiplier including planar components, or mixed fiber-based and planar components. The planar components may be incorporated using cascaded, inexpensive, off-the-shelf fiber-fused couplers. The output of a fiber stage may be coupled to planar waveguide-based MZIs for subsequent stages. These multipliers may then be used to multiply the repetition rate of low repetition rate frequency combs. As an example, for an initial pulse repetition rate of 250 MHz (typical of fiber femtosecond lasers), a 3-stage chip may produce a 2 GHz output, and a 4-stage design may yield a repetition rate of 4 GHz.

In some embodiments, the length of the first branch 206a and the second branch 206b may be increased or decreased using feedback servos. Active control of the branch lengths using a feedback servo may ensure a low phase noise pulse train. In the case of a fiber-based MZI, either piezoelectric or thermal actuators can be used to modify the length of the branches. In the case of the integrated photonic chip with planar components, thermal actuation may be used. Electro-optic and piezo tuning may also be used to adjust the branch lengths.

In some embodiments, the material of the planar photonic waveguide may be adjusted as loss in the material can further affect the branch length in the MZIs. Specifically, the power ratio in each coupler stage may be tailored to reflect the material-specific loss, and thus may render the coupling ratio different from 50-50.

In some embodiments, a broad bandwidth application may be achieved by breaking up the input spectrum into narrower band channels, and thus have an arrayed series of MZI waveguides and couplers.

Figure 3A:
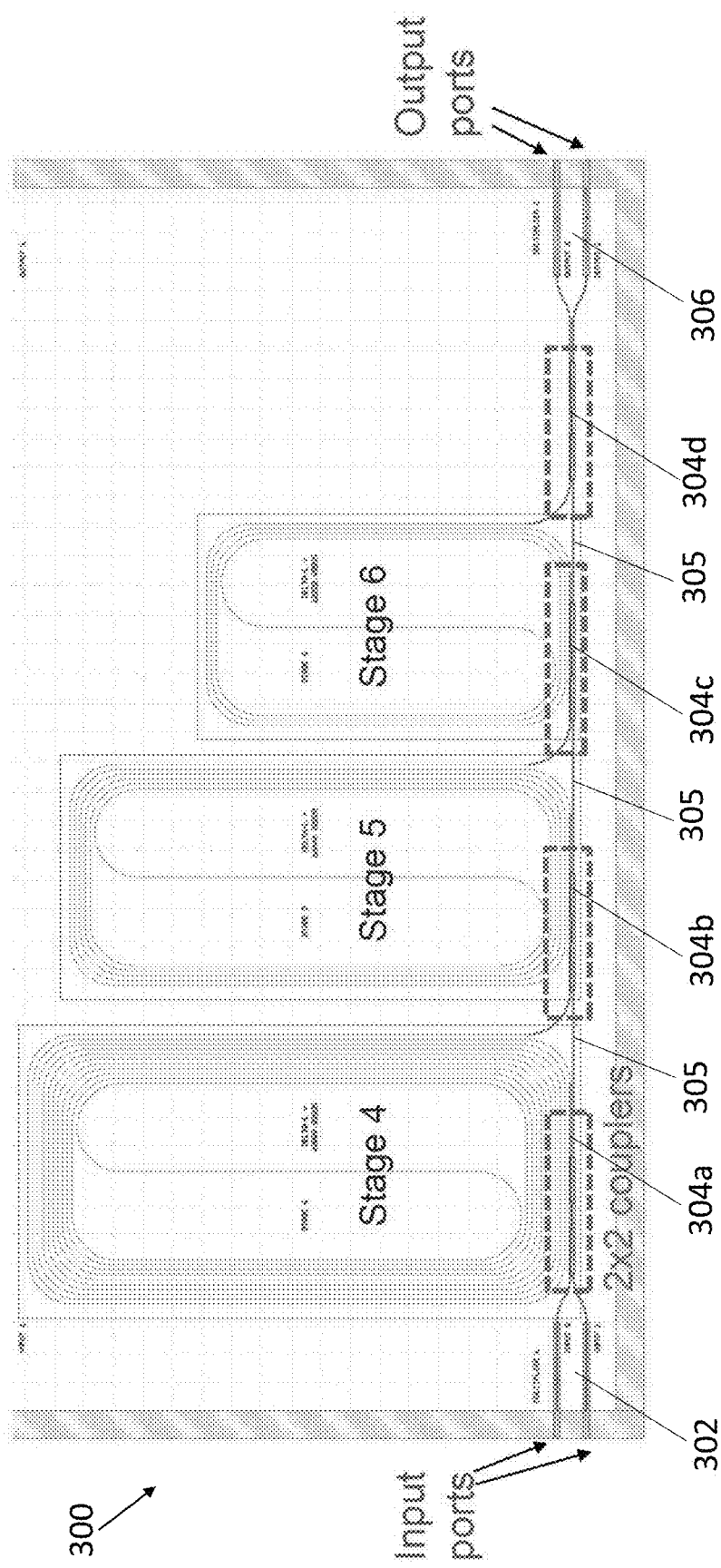
FIG. 3A conceptually illustrates an integrated photonic chip in accordance with an embodiment of the invention.

FIG. 3A conceptually illustrates an integrated photonic chip 300 in accordance with an embodiment of the invention. As illustrated, the integrated photonic chip 300 includes one or more input ports 302. In some embodiments, the input ports 302 may be two or more input ports. One of the input ports 302 may be used for a backup input port. In some embodiments, the integrated photonic chip 300 may be a three-stage chip where the input ports 302 feed into a first stage 304a, a second stage 304b, and a third stage 304c. The first stage 304a, the second stage 304b, and the third stage 304c are of similar structure as that described in connection with the plurality of MZIs 104a, 104b, 104c in FIG. 1 and FIG. 2. The first stage 304a, the second stage 304b, and the third stage 304c may be cascading and connected via optical waveguide 305. In some embodiments, the photonic chip 300 may be a four-stage chip including a fourth stage 304d which may function similarly to the plurality of MZIs 104a, 104b, 104c in FIG. 1 and FIG. 2. The last stage may be connected to one or more output ports 306. In some embodiments, the output ports 306 may be two or more output ports. One of the output ports 306 may be used for a backup output port.

Figure 3B:
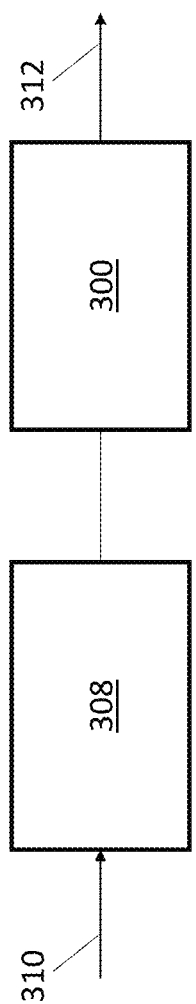
FIG. 3B conceptually illustrates a pulse rate multiplier in accordance with an embodiment of the invention.

FIG. 3B conceptually illustrates a pulse rate multiplier in accordance with an embodiment of the invention. As illustrated, the integrated photonic chip 300 described in connection with FIG. 3A may be connected in series with another pulse rate multiplier 308. The other pulse rate multiplier 308 may also be an integrated photonic chip with optical waveguides.

In some embodiments, the other pulse rate multiplier 308 may be a front-end fiber-based pulse rate multiplier. The input signal 310 is a pulsed signal with a certain frequency. The input signal 310 may be a low frequency pulsed signal. As described above, a fiber-based pulse rate multiplier is suitable for lower frequency pulsed signals however may not be fabricated for use with higher frequency pulsed signals. In some embodiments, the other pulse rate multiplier 308 may include three stages which would multiply the input signal 310 by eight creating a higher frequency pulsed signal which would be fed into the integrated photonic chip 300. As described above, the integrated photonic chip 300 may be fabricated to multiply higher frequencies. In some embodiments, the integrated photonic chip 300 may be a four-stage chip which would multiply the frequency by sixteen. Thus, the total multiplication factor may be 128 (8×16).

Example advantages to using an integrated photonic chip with monolithic optical waveguides include:
High accuracy of manufacturing: due to microfabrication technology, the length of each branch in the waveguide may be well controlled. Even at the third or fourth waveguide stage, the length error of <0.3 mm may be easily achieved.
Low insertion loss: because the multi-stage waveguide is manufactured monolithically, there may be no insertion loss between stages.
Flexibility of dispersion engineering: dispersion engineering of the waveguides might compress the pulse duration thus avoiding the temporal overlap of the pulses from the two arms of each stage, leading to higher purity repetition rate or enabling more multiplication stages.
The ability to obtain higher repetition rate frequency combs derived from commercially available compact fiber laser combs, thus increasing the applications space and customer base for those products.

None of these advantages may be available with previously developed fiber-based pulse frequency multipliers. In some embodiments, the morphology of the monolithic optical waveguides may be optimized in a way to avoid deformation of the optical pulses produced by the frequency comb. Optical fibers may have limited flexibility in adjustment of the dispersion. In contrast, by changing the morphology of a waveguide one can adjust and optimize the dispersion for the particular pulse shape and wavelength.

Figure 4:
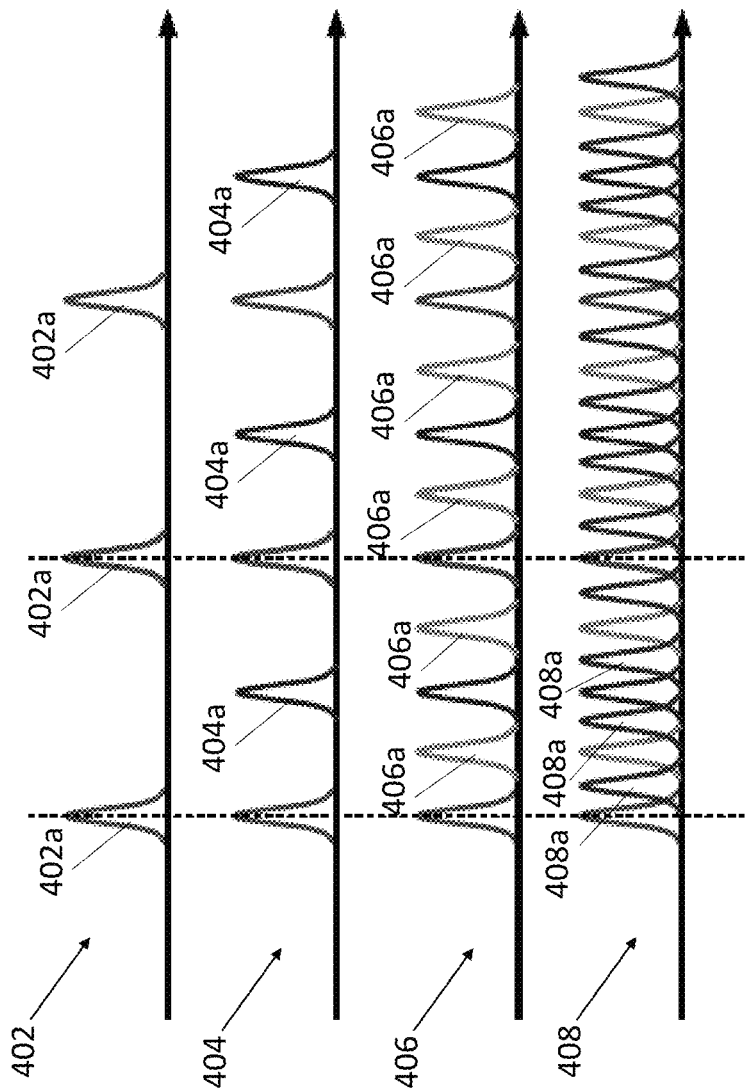
FIG. 4 is a plot of pulses vs. time conceptually illustrating the operation of the integrated photonic chip 300 of FIG. 3A.

FIG. 4 is a plot of pulses vs. time conceptually illustrating the operation of the integrated photonic chip 300 of FIG. 3A. A first plot 402 illustrates the input signal 402a which has a certain pulse frequency. A second plot 404 illustrates the signal output of the first stage 304a. As illustrated, the input signal 310 has been doubled with the original input signal 402a along with a first stage signal 404a. A third plot 406 illustrates the signal output of the second stage 304b. As illustrated, the signal output from the first stage 304a has been doubled with the addition of the original input signal 402a, the first stage signal 404a, and a second stage signal 406a. A fourth plot 408 illustrates the signal output of the third stage 304c. As illustrated, the signal output from the second stage 304b has been doubled with the addition of the original input signal 402a, the first stage signal 404a, the second stage signal 406a, and a third stage signal 408a. Thus, the output of the third stage 304c has been multiplied by eight ($2^3$) over the original input signal 402a.

FIG. 5 is a block diagram conceptually illustrating an example MWI integrated on a PIC in accordance with an embodiment of the invention. The PIC 500 includes a waveguide fiber coupler 502 which may receive input signals from an input optical fiber 508. In some embodiments, the input signals may be from a planar waveguide integrated on the PIC 500. The waveguide fiber coupler 502 inputs signals from the optical fiber 508 into a first waveguide branch 504a and a second waveguide branch 504b which correspond to the first branch 206a and the second branch 206b described in connection with FIGS. 2 and 3. As described above, the first waveguide branch 504a and the second waveguide branch 504b have a different arm length which benefit from being slightly different length. This slight length difference may not be both realizable and sustainable using optical fibers and thus it is beneficial for the first waveguide branch 504a and the second waveguide branch 504b to be fabricated as a planar structure in the PIC 500. The first waveguide branch 504a and the second waveguide branch 504b each output a signal into a waveguide fiber coupler 506 which outputs the output signals into an output optical fiber 510. In some embodiments, the output signals may be output into an output optical waveguide integrated on the PIC 500.

In some embodiments, the PIC 500 may include multiple MWIs which are connected via connecting optical waveguides. Examples of the waveguide fiber couplers 502,506 integrated on a PIC 500 are disclosed in Nambiar, S., Ranganath, P., Kallega, R. et al. High efficiency DBR assisted grating chirp generators for silicon nitride fiber-chip coupling. Sci Rep 9, 18821 (2019) which is hereby incorporated by reference in its entirety for all purposes. In some embodiments, the waveguide fiber couplers 502,506 may be fabricated using silicon nitride (SiN) or indium phosphide (InP). In some embodiments, the waveguide fiber couplers 502,506 may include silicon on insulator (SOI). In some embodiments, the waveguide fiber couplers 502,506 may include alternating layers of silicon and silicon dioxide (SiO$_2$). The PIC 500 may include the waveguide fiber couplers 502,506, the first waveguide branch 504a and the second waveguide branch 504b which may be all integrated as planar structure on the PIC 500. In some embodiments, the waveguide fiber couplers 502,506 may be grating couplers. In some embodiments, the length of each of the first waveguide branch 504a and the second waveguide branch 504b may be controlled via actuation. The actuation may occur via feedback servos which may be controlled using the piezo-electric effect, thermal changes, electro-optic effect, and/or carrier injection. In some embodiments, the shoulders of the MZIs may contain on-chip amplifiers which may reduce the loss while keeping the pulse shape intact. In some embodiments, the on-chip amplifiers may be engineered using group velocity dispersion and optical non-linearity engineering.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An optical frequency comb repetition rate multiplier comprising:
   an input;
   an output;
   a photonic integrated circuit (PIC) comprising cascading Mach-Zehnder interferometers (MZIs), wherein each of the MZIs comprises:
      an input splitter which splits an input signal into a first branch and a second branch, wherein the first branch is longer than the second branch by an odd number of multiples of half an input period; and
      an output combiner which combines the signal from the first branch and the second branch into a multiplied signal,
   wherein the input is connected to one end of the PIC and the output is connected to the other end of the PIC such that a signal from the input runs through the cascading MZIs and out of the output; and
   wherein the input is configured to receive an input pulsed signal and the output is configured to output a repetition rate multiplied signal.

2. The optical frequency comb repetition rate multiplier of claim 1, wherein the cascading MZIs comprise a plurality of MZIs connected in series.

3. The optical frequency comb repetition rate multiplier of claim 1, wherein each of the MZIs double the input pulsed signal.

4. The optical frequency comb repetition rate multiplier of claim 1, wherein the PIC is a monolithic chip with planar components.

5. The optical frequency comb repetition rate multiplier of claim 4, wherein the monolithic chip includes optical waveguides directly embedded in the monolithic chip.

6. The optical frequency comb repetition rate multiplier of claim 4, wherein each of the MZIs is fabricated including a first branch and a second branch which includes optical waveguides directly embedded in the monolithic chip.

7. The optical frequency comb repetition rate multiplier of claim 4, wherein the cascading MZIs are connected together with optical waveguides directly embedded in the monolithic chip.

8. An optical frequency comb repetition rate multiplier comprising:
   an input;
   an output;
   a photonic integrated circuit (PIC) comprising cascading Mach-Zehnder interferometers (MZIs), wherein at least one of the MZIs includes a first branch and a second branch which includes feedback servos that actively control the branch length of the first branch and the second branch,
   wherein the input is connected to one end of the PIC and the output is connected to the other end of the PIC such that a signal from the input runs through the cascading MZIs and out of the output; and
   wherein the input is configured to receive an input pulsed signal and the output is configured to output a repetition rate multiplied signal.

9. The optical frequency comb repetition rate multiplier of claim 1, further comprising an optical fiber-based pulse rate multiplier, wherein the input is connected to the optical fiber-based pulse rate multiplier and the PIC is connected in series with the optical fiber-based pulse rate multiplier.

10. The optical frequency comb repetition rate multiplier of claim 9, further comprising a pulse generator connected to the input and configured to generate pulses with a certain frequency.

11. The optical frequency comb repetition rate multiplier of claim 10, wherein an output of the optical fiber-based pulse rate multiplier is less than 3 GHz.

12. The optical frequency comb repetition rate multiplier of claim 9, wherein the optical fiber-based pulse rate multiplier comprises cascading MZIs each including a first branch and a second branch which include optical fibers.

13. The optical frequency comb repetition rate multiplier of claim 12, wherein the optical fibers all have a length greater than 2 cm.

14. The optical frequency comb repetition rate multiplier of claim 1, wherein the input comprises two or more inputs with one of the inputs providing the input pulsed signal and the other inputs serving as backups.

15. The optical frequency comb repetition rate multiplier of claim 1, wherein the output comprises two or more outputs with one of the outputs providing the output repetition rate multiplied signal and the other outputs serving as backups.

16. The optical frequency comb repetition rate multiplier of claim 1, wherein the cascading MZIs includes three stages each connected in series.

17. The optical frequency comb repetition rate multiplier of claim 1, wherein the first branch is longer than the second branch of the last stage MZI by less than 2 cm.

18. The optical frequency comb repetition rate multiplier of claim 1, wherein the first branch is longer than the second branch of the last stage MZI by less than 2 mm.

19. The optical frequency comb repetition rate multiplier of claim 8, wherein the feedback servos are actuated using a piezo-electric effect, an electro-optic effect, thermal changes, and/or carrier injection.

20. The optical frequency comb repetition rate multiplier of claim 1, wherein the input splitter and the output combiner each comprise waveguide couplers;

wherein the first branch and the second branch each comprise waveguides; and wherein the waveguide couplers and the waveguides are all connected planar structures on the PIC.

21. The optical frequency comb repetition rate multiplier of claim 20, wherein the waveguide couplers comprise silicon nitride and/or indium phosphide.

22. The optical frequency comb repetition rate multiplier of claim 20, wherein the waveguide couplers comprise silicon on insulator.

* * * * *